Nov. 26, 1968  R. C. STAATS  3,412,618
CONTROL APPARATUS FOR INERTIAL INSTRUMENTS
Filed Aug. 12, 1963  2 Sheets-Sheet 1
FIG. 1
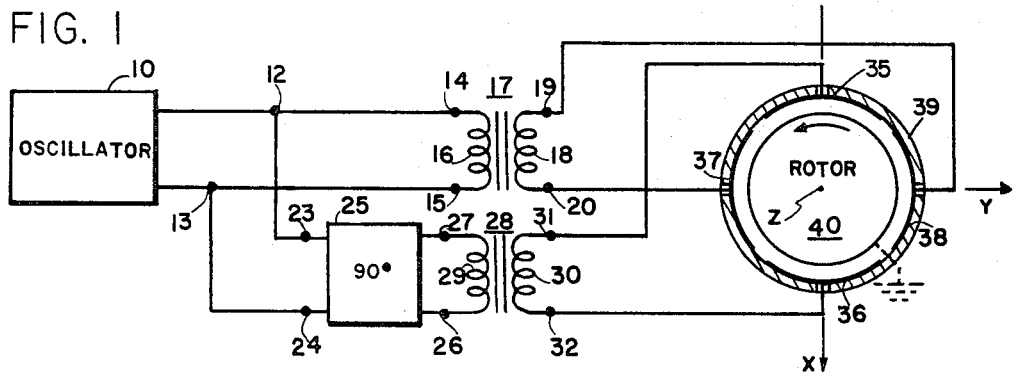
FIG. 2
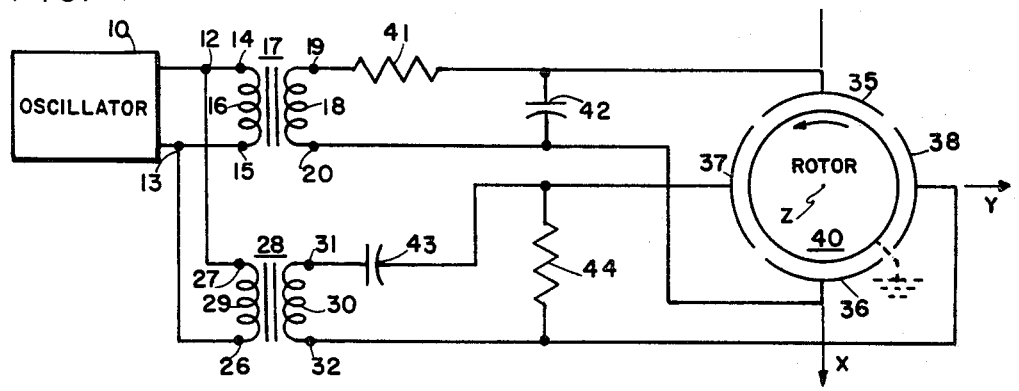
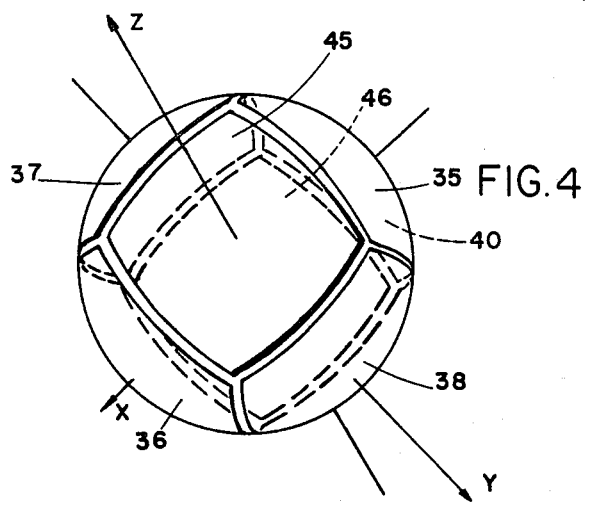
FIG. 4
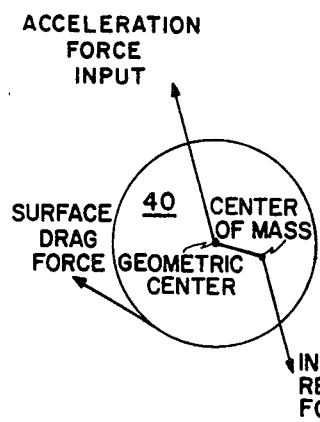
FIG. 6
INVENTOR.
ROBERT C. STAATS
BY
Roger W. Jensen
ATTORNEY

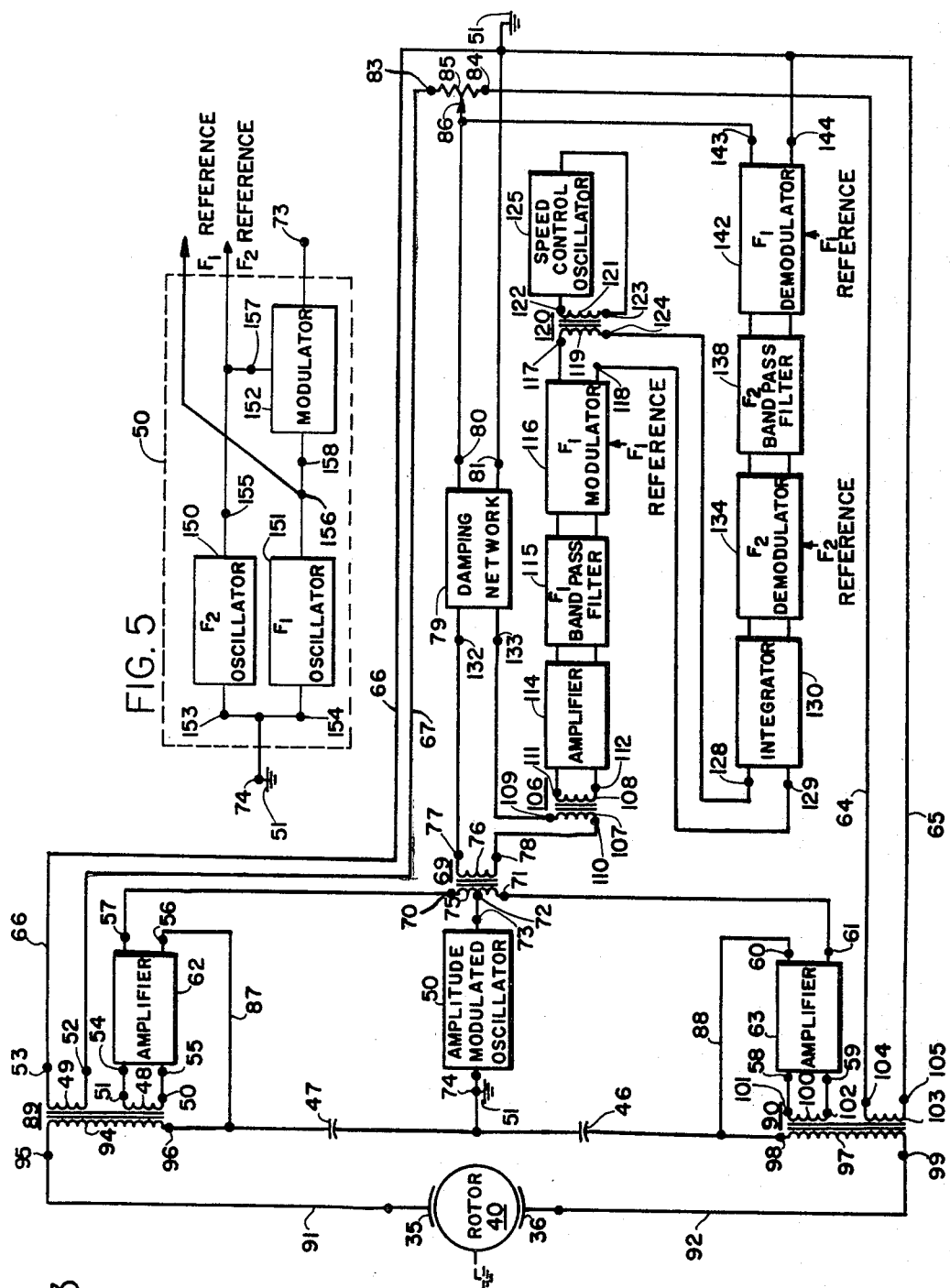

United States Patent Office 3,412,618
Patented Nov. 26, 1968

3,412,618
CONTROL APPARATUS FOR INERTIAL
INSTRUMENTS
Robert C. Staats, Fridley, Minn., assignor to Honeywell
Inc., a corporation of Delaware
Filed Aug. 12, 1963, Ser. No. 301,326
8 Claims. (Cl. 74—5.7)

The present invention is concerned with gyroscopic inertial instruments and more particularly with the type of inertial instruments where the inertial member is supported by means of fields. The present invention is particularly applicable to the gyroscopic inertial instruments in which the inertial member is supported by means of electric fields.

One of the physical limitations present in each gyroscopic inertial instrument is the run-down of the spin velocity of the inertial member. Various factors, such as bearing friction and gas drag on the member, are responsible for this effect and even the most precise and careful design has failed to completely eliminate them. In the so-called electrostatic gyroscope where the inertial member is supported by electric fields, the problem of mechanical friction has been eliminated since the mechanical bearings which are the source of friction have been eliminated. In this way, the run-down rates have been greatly reduced. It is now possible to have run-down periods of months and even years as opposed to hours and days of the prior art mechanically supported devices. Even so, however, the inertial member is still continually slowed down by gas drag to some extent even though the gas is almost completely removed and the member is rotating in a near vacuum. Additional tangential retarding forces on the member are caused by electric and magnetic fields necessary for the suspension of the inertial member.

In the electrostatic gyroscope the tangential forces due to electric and magnetic fields could ideally be eliminated by providing a completely spherical and nonmagnetic inertial member. All of the forces would in such a case be directed toward the geometric center of the member and would have no tangential components. Although rotors with a remarkable degree of sphericity can now be made, still sufficient discrepancies are usually present which, coupled with the gas drag, combine to cause slowing down of the inertial member. The present invention solves this difficulty, not by eliminating these effects and their causes, but by compensating for them by providing a speed control mechanism. It provides a novel means for automatically imparting angular acceleration to the member whenever the angular velocity decreases below the desired value.

It is therefore an object of this invention to provide an improved inertial instrument.

It is a further object of this invention to provide the means for controlling the angular velocity of the inertial member in a field supported inertial instrument.

These and further objects will become apparent upon inspection of the following specification, claims, and drawings in which:

FIGURE 1 is a simple schematic diagram depicting the present invention;

FIGURE 2 is similar to FIGURE 1 but shows specifically how a 90° phase relation between two signals required for the operation of this invention can be obtained;

FIGURE 3 shows one channel of an electrostatic suspension incorporating the present invention;

FIGURE 4 depicts a preferred embodiment of the electrode structure best suited for the operation of the present invention;

FIGURE 5 is a schematic diagram showing one possible embodiment of the amplitude modulated oscillator used in FIGURE 3; and FIGURE 6 is a vector representation of the forces acting on a rotating spherical inertial member with radial mass unbalance.

Referring now to FIGURE 1, an oscillator 10 has output terminals 12 and 13. The output terminal 12 of oscillator 10 is connected to an end terminal 14 of a primary winding 16 of a transformer 17 and to an input terminal 23 of a 90° phase network 25. Primary winding 16 of transformer 17 further has an end terminal 15 connected to the output terminal 13 of oscillator 10. Transformer 17 also has a secondary winding 18 with end terminals 19 and 20. End terminal 19 of secondary winding 18 is connected to an electrode 38 mounted on a housing 39 adjacent to a spherical rotor 40 and end terminal 20 of secondary winding 18 is connected to an electrode 37 mounted on housing 39 adjacent to rotor 40 at a location diametrically opposite to electrode 38.

The 90° phase network 25 further has an input terminal 24 and output terminals 26 and 27. Input terminal 24 of network 25 is connected to output terminal 13 of oscillator 10 while the output terminals 26 and 27 of network 25 are also end terminals of a primary winding 29 of a transformer 28. Transformer 28 further has a secondary winding 30 with end teminals 31 and 32. End terminal 31 is connected to an electrode 35 mounted on housing 39 adjacent to spherical rotor 40 and end terminal 32 of secondary winding 30 is connected to an electrode 36 mounted on housing 39 adjacent to rotor 40 at a position diametrically opposite to electrode 35. Rotor 40 is spinning about an axis Z at an angular velocity corresponding to the output frequency of oscillator 10. Electrodes 35 and 36 form a first electrode pair centered on an X axis perpendicular to the spin axis Z and intersecting spin axis Z at the geometric center of the inertial member 40. Electrodes 37 and 38 form a second electrode pair centered on axis Y which is mutually perpendicular to the X and Z axes, intersecting both of them at the geometric center of rotor 40.

FIGURE 2 is similar to FIGURE 1 except that the 90° phase network is replaced by a lead and a lag network adapted to cause the signal at one pair of the electrodes to lead the oscillator signal by 45° and the signal at the other pair of the electrodes to lag by 45° behind the oscillator signal. Oscillator 10 has output terminals 12 and 13, terminal 12 being connected to an end terminal 14 of a primary winding 16 of a transformer 17 and to an end terminal 27 of a primary winding 29 of a transformer 28. Primary winding 16 of transformer 17 further has an end terminal 15 connected to output terminal 13 of oscillator 10 and primary winding 29 of transformer 28 has an end terminal 26 also connected to output terminal 13 of oscillator 10. Transformer 17 further has a secondary winding 18 with end terminals 19 and 20 and transformer 28 also has a secondary winding 30 with end terminals 31 and 32. End terminal 19 is connected through a resistor 41 to an electrode 35 positioned adjacent to a rotor 40. End terminal 20 of secondary winding 18 is connected directly to an electrode 36 adjacent to rotor 40. A capacitor 42 is connected between electrodes 35 and 36. End terminal 31 of secondary winding 30 of transformer 28 is connected to an electrode 37 through a capacitor 43 and end terminal 32 of secondary winding 30 is connected directly to an electrode 38. The configuration of the electrode structure and its relation to rotor 40 is the same as that explained with reference to FIGURE 1.

FIGURE 3 shows one channel of a three phase electrostatic suspension system incorporating the present invention to provide speed control of the inertial member. The basic suspension system is of the type shown in a prior patent application also in the name of the present inventor, filed on Dec. 5, 1962, Ser. No. 242,549. That application is also assigned to the assignee of the present application.

In FIGURE 3 an amplitude modulated oscillator 50 has output terminals 73 and 74. Oscillator 50 provides an output signal having a carrier frequency $F_1$ amplitude modulated by a second frequency $F_2$. A possible embodiment of oscillator 50 is shown in FIGURE 5. Output terminal 74 is connected directly to ground 51 and output terminal 73 is connected to a center tap 72 of a primary winding 75 of a transformer 69. Primary winding 75 of transformer 69 further has end terminals 70 and 71. Transformer 69 also has a secondary winding 76 with end terminals 77 and 78. End terminal 70 of primary winding 75 is connected to an input terminal 57 of a constant current amplifier 62, and end terminal 71 of primary winding 75 is connected to an input terminal 61 of a constant current amplifier 63. Amplifier 62 further has an input terminal 56 and output terminals 54 and 55. Output terminal 54 of amplifier 62 is connected to end terminal 51 of a primary winding 48 of a transformer 89. Primary winding 48 further has an end terminal 50 connected to output terminal 55 of amplifier 62. Transformer 89 also has a secondary winding 94 with end terminals 95 and 96 and a secondary winding 49 with end terminals 52 and 53. End terminal 96 of secondary winding 94 is connected to input terminal 56 of amplifier 62 by means of a conductor 87 and to ground 51 through a capacitor 47, while end terminal 95 of secondary winding 94 is connected to an electrode 35 by means of a conductor 91.

Amplifier 63 also has an input terminal 60 and output terminals 58 and 59. Output terminal 58 is connected to an end terminal 101 of a primary winding 100 of a transformer 90. Primary winding 100 of transformer 90 also has an end terminal 102 connected directly to output terminal 59 of amplifier 63. Transformer 90 further has a secondary winding 97 with end terminals 98 and 99 and a secondary winding 103 with end terminals 104 and 105. End terminal 98 of secondary winding 97 is connected to input terminal 60 of amplifier 63 by means of a conductor 88 and to ground 51 through a capacitor 46, and end terminal 99 of secondary winding 97 is connected to a rotor supporting electrode 36 by means of a conductor 92. An inertial member or rotor 40 is suspended between electrodes 35 and 36.

End terminal 53 of secondary winding 49 of transformer 89 is connected to ground 51 by means of a conductor 66 and end terminal 52 of secondary winding 49 is connected to an end terminal 83 of a potentiometer 85 by means of a conductor 67. Potentiometer 85 further has an end terminal 84 and a wiper 86. End terminal 105 of secondary winding 103 is connected to ground 51 by means of a conductor 65 and end terminal 104 is connected to terminal 84 of potentiometer 85. Wiper 86 is connected directly to an input terminal 80 of a damping network 79. Damping network 79 further has an input terminal 81 connected to ground 51 and output terminals 132 and 133. Output terminal 132 of damping network 79 is connected to an end terminal 77 of secondary winding 76 of transformer 69 and output terminal 133 of damping network 79 is connected to an end terminal 109 of a secondary winding 107 of a transformer 106. Secondary winding 107 of transformer 106 further has an end terminal 110 connected to end terminal 78 of secondary winding 76 of transformer 69. Transformer 106 also has a primary winding 108 with end terminals 111 and 112 which are also the output terminals of an amplifier 114. Wiper 86 of potentiometer 85 is also connected to an input terminal 143 of an $F_1$ demodulator 142. Demodulator 142 further has an input terminal 144 connected directly to ground 51. The output of demodulator 142 is connected to the input of an $F_2$ band pass filter 138 and the output of filter 138 is connected to the input of an $F_2$ demodulator 134. The output of demodulator 134 is connected to the input of an integrator 130. Integrator 130 further has output terminals 128 and 129. Output terminal 128 of integrator 130 is connected to an end terminal 124 of a secondary winding 119 of a transformer 120. Secondary winding 119 further has and end terminal 117 which is also an input terminal of an $F_1$ modulator 116. Transformer 120 further has a primary winding 121 with end terminals 122 and 123 which are also output terminals of a speed control oscillator 125. Modulator 116 also has an input terminal 119 connected directly to output terminal 129 of integrator 130. The output of $F_1$ modulator 116 is connected to the input of an $F_1$ band pass filter 115, and the output of band pass filter 115 is connected to the input of an amplifier 114. Amplifier 114 further has output terminals 111 and 112 which are also end terminals of primary winding 108 of transformer 106.

The electrode structure illustrated in FIGURE 4 is comprised of six electrically isolated electrodes 35, 36, 37, 38, 45, and 46, outlining a spherical cavity or enclosure with a radius somewhat larger than the radius of an inertial member 40.

Electrodes 35 and 36, 37 and 38, and 45 and 46 form electrode pairs with the two electrodes of each pair being diametrically opposed, so that a straight line joining the geometric centers of the two electrodes of each pair passes substantially through the center of the electrode cavity. The three axes of the three pairs are substantially normal to each other (orthogonal) and intersect each other at the center of the electrode cavity. The three axes are labeled X, Y, and Z; the X axis being associated with electrodes 35 and 36, the Y axis being associated with electrodes 37 and 38, and the Z axis being associated with electrodes 45 and 46. This arrangement ideally fulfills the requirement of a three phase suspension design, because it displays perfect symmetry about each of the suspension axes and utilizes the maximum area available for electrostatic support forces.

FIGURE 5 illustrates one possible way to mechanize the amplitude modulated oscillator 50 in FIGURE 3. An $F_2$ oscillator 50 has two output terminals 153 and 155. Output terminal 153 is connected to ground 51 while output 155 is connected to an input terminal 157 of a modulator 152. Modulator 152 has an output terminal 158 and an output terminal 173. Input terminal 158 of modulator 152 is connected to an output terminal 156 of an $F_1$ oscillator 151. Oscillator 151 further has an output terminal 154 connected to ground 51. $F_1$ provides the carrier frequency for the signal and is of substantial higher frequency than $F_2$. The signal appearing at the output terminal 73 of modulator 152 is comprised of a carrier frequency $F_1$ whose amplitude varies at the rate of $F_2$. Oscillators 150 and 151 also provide their reference frequencies wherever required in FIGURE 3.

*Operation*

In FIGURE 1 oscillator 10 provides an output signal which is impressed between end terminals 14 and 15 of primary winding 16 of transformer 17 and induced in the secondary winding 18 between end terminals 19 and 20. The output signal of oscillator 10 is also shifted by 90° by phase network 25 and impressed between end terminals 26 and 27 of primary winding 29 of transformer 28 and induced in the secondary winding 30 between end terminals 31 and 32. The signal from the secondary winding 18 of transformer 17 is applied between electrodes 37 and 38 adjacent to rotor 40, and signal from the secondary winding 30 of transformer 28 is applied between electrodes 35 and 36 adjacent to rotor 40. The signals between electrodes 35 and 36, and 37 and 38 are identical with the exception that they are in a 90° phase relationship. Rotor 40 is rotating with a spin velocity which corresponds to the frequency of the signal output of oscillator 10. The initial spin-up of the inertial member can be accomplished in a number of ways. The present invention is capable of providing the necessary rotational forces. It might be more practical, however, to provide additional means, such as illustrated in FIGURE 7 of Patent 3,003,-356 by A. T. Nordsieck, issued Oct. 10, 1961, because large forces are more easily produced by magnetic fields than electric fields. If rotor 40 had an ideally perfect spherical or cylindrical shape whose geometrical center would coincide with its center of mass, the forces between the electrode and the rotor would act through the center of mass and no rotational torques would be possible. In the actual situation, however, the inertial member has a certain degree of radial mass unbalance so that the geometric center of the member and its mass center do not coincide exactly. The suspension forces between the electrodes and the inertial member are designed to act through the geometric center of the inertial member. A force acting on a rigid body along a line not passing through its center of mass will be counter balanced by an inertial reaction force acting through the center of mass, producing a couple. The forces acting on a spherical inertial mass with radial mass unbalance are illustrated in FIGURE 6. As shown in FIGURE 6, when an acceleration force input is directed through the geometric center, an inertial reaction force is produced at the center of mass causing a couple, tending to rotate the member until the geometric center and the mass center are oriented in a straight line along the acceleration force input vector. By rotating the acceleration force input vector about the inertial member, it is possible to maintain a continuous rotational torque on the member until the member and the acceleration vector are rotating at the same angular rate.

In the present case, a rotating acceleration vector is obtained by injecting a sinusoidal dither signal into the X and Y suspension servo loops. This forces a translational oscillation of the inertial member in the X, Y plane. The dither signal in the X channel is 90° phase displaced from the dither signal in the Y channel, causing the geometric center of the rotor to describe a circle, and in this manner applying a rotating linear acceleration vector to the geometric center. The rotational torques tend to maintain the rotor at angular velocity corresponding to the frequency of oscillator 10. The frequency of oscillator 10 must be adjusted to correspond to the angular velocity at which it is desired to have rotor 40 rotating.

FIGURE 2 is very similar to FIGURE 1 except that it differs in the manner in which the 90° phase relationship between the signals at electrodes 35 and 36 and electrodes 37 and 38 is established. Oscillator 10 provides an output signal which is impressed between end terminals 14 and 15 of primary winding 16 of transformer 17 and induced in the secondary winding 18 between end terminals 19 and 20. The output signal of oscillator 10 is also impressed on the primary winding 29 of transformer 28 and induced in the secondary winding 20 between end terminals 31 and 32. The signal appearing between end terminals 19 and 20 of secondary winding 18 of transformer 17 is delayed by 45° by a lag network comprised of resistor 41 in series with winding 18 and capacitor 42 in parallel with winding 18. The delayed signal is then applied between electrodes 35 and 36 adjacent to rotor 40. The signal appearing between end terminals 31 and 32 of secondary winding 30 of transformer 28 is advanced by 45° by a lead network comprised of capacitor 43 in series with winding 30 and resistor 44 in parallel with winding 30. The advanced signal is then applied between electrodes 37 and 38 adjacent to rotor 40. The signals appearing between electrodes 35 and 36, and 37 and 38, are then in 90° phase relationship and the operation is the same as explained with reference to FIGURE 1.

The present invention is especially well adapted for application in inertial instruments where the inertial member is supported by means of electrostatic forces. The electrodes, which are required to provide the necessary suspension forces can serve to accomplish the additional function of controlling the angular velocity of the inertial member as taught by this invention.

FIGURE 3 illustrates one channel of a three phase electrostatic suspension system such as shown in said copending application Ser. No. 242,549. In a three phase suspension system such as illustrated in the above referenced patent application the suspension system is comprised of three channels, each channel acting to balance forces along one of three mutually orthogonal axes X, Y, and Z. In the gimbaled mode of the inertial instrument, the electrode structure is servoed to maintain a constant relationship with the inertial member and the spin axis of the member is always maintained parallel to the Z axis. To incorporate the present invention in such a case it is only necessary to slightly modify the X and Y channels of the suspension. FIGURE 3 illustrates how such a modification can be made. Oscillator 50 provides an output signal comprised of a carrier frequency $F_1$ modulated by a second frequency $F_2$ (in a successful operation of an experimental model $F_1$ was chosen to be 20 kc. and $F_2$ chosen to be 5 kc.). The output of oscillator 50 is fed through primary winding 75 of transformer 69 to the input terminals 57 and 61 of amplifiers 62 and 63 respectively. In amplifier 62 the signal is amplified and impressed across primary winding 48 of transformer 89 and in amplifier 63 the signal is amplified and impressed across primary winding 100 of transformer 90. The signal across primary winding 48 of transformer 89 is induced in the secondary winding 94 and fed to electrode 35 adjacent to rotor 40. The signal across primary winding 100 of transformer 90 is induced in its secondary winding 97 and fed to electrode 36 adjacent to rotor 40. Electric fields are thus established between rotor 40 and electrodes 35 and 36, providing the electric forces necessary for the suspension of the inertial member.

Signals proportional to voltage between the inertial member 40 and electrode 35 are sensed by the secondary winding 49 of transformer 89 and the signals proportional to the voltage between rotor 40 and electrode 36 are sensed by secondary winding 103 of transformer 90. If the two voltages are equal, no signal appears across potentiometer 85, but if the two voltages differ a signal appears across potentiometer 85 and is fed into damping network 79 at input terminal 80 and into demodulator 142 at its input terminal 143. The signal across potentiometer 85 will normally appear as $F_1$ modulated by $F_2$. It will be shown, however, that if rotor 40 is centered exactly between electrodes 35 and 36 the signal across potentiometer 84 will appear as an unmodulated $F_1$ because the effect of the modulation will be exactly cancelled out by the signals at winding 49 of transformer 89 and winding 103 of transformer 90.

The signal from potentiometer 85 is fed to demodulator 142 where carrier frequency $F_1$ is eliminated. The output of demodulator 142 provides a signal which contains a component of $F_2$. This signal is passed through a band pass filter eliminating all except the $F_2$ component. The signal from band pass filter 138 is fed to demodulator 134 which converts the $F_2$ signal and provides a DC output. The DC output of demodulator 134 is fed into integrator or detector 130 and the integrated signal appears between output terminals 128 and 129 of integrator 130. If for the moment only the operation of the support channel, without the speed control feature, is considered, speed control oscillator 125 and transformer 120 can be eliminated. The signal from integrator 130 is fed directly into modulator 116 which modulates the DC signal from the output of integrator 130 with the $F_1$ carrier frequency. The signal from modulator 116 is fed through $F_1$ band pass filter to eliminate all other undesirable components. This signal from the output of band pass filter 115 is amplified by amplifier 114 and impressed between end terminals 111 and 112 of primary winding 108 of transformer 106 and induced in its secondary winding 107. The signal from winding 107 of transformer 106 is fed to winding 76 of transformer 69, induced in winding 75 of transformer 69 and superimposed on the signal from amplitude modulated oscillator 50. Since the signal from oscillator 50 is fed to amplifiers 62 and 63 through the center tap of primary winding 75, it can be seen that the signal induced from the secondary winding 76 will add to the signal directed to one of the amplifiers and subtract from the signal directed to the other amplifier.

It should be noted that in looking at the signal appearing across potentiometer 85, the interest is focused only on the $F_2$ modulation of the carrier frequency $F_1$. In other words, if the signal across potentiometer 85 is composed of only $F_1$ and contains no modulation by $F_2$, the output of demodulator 134 is zero and the output of amplifier 114 remains unchanged. It should also be noted that the output signal of amplifier 114 contains only the $F_1$ frequency (with nonperiodic changes in amplitude) and that the addition of this signal to the output signal of oscillator 50 affects only the amplitude of the carrier frequency $F_1$ and does not affect the amount of modulation $F_2$. Since the signal at the output of oscillator 50 is of constant amplitude and since the gain of amplifiers 62 and 63 is constant, the amount of modulation remains unchanged.

As stated previously, the signals appearing across winding 49 of transformer 89 and winding 103 of transformer 90 are proportional to the voltages between rotor 40 and electrodes 35 and 36 respectively. The voltages between the rotor and the electrodes in turn varies with the position of the rotor. The voltage decreases with a diminishing electrode to rotor gap and increases with increasing electrode to rotor gap. The displacement of the rotor from the center of the electrode cavity will be reflected in the signals appearing across windings 49 and 103, and the amount of modulation in the signal appearing across potentiometer 85 will be indicative of the rotor displacement. The presence of modulation in the signal across potentiometer 85 will cause a change in the amplitude of the output signal of amplifier 114.

The output signal of amplifier 114 is then superimposed on the signal from oscillator 50 and fed to amplifiers 62 and 63 as explained before. The output signal of amplifier 114 keeps changing until the rotor 40 is exactly at the midpoint between electrodes 35 and 36 and then remains constant until some external force again unbalances the rotor and shifts its position from the center of the electrode cavity.

A simple modification of the suspension electronics, as explained above, will provide the automatic speed control of rotor 40. Speed control oscillator 125 has a frequency which corresponds to the desirable angular velocity of rotor 40. The output signal of speed control oscillator 125 appears between end terminals 122 and 123 of primary winding 121 of transformer 120 and is induced in the secondary winding 119. The signals from the output of integrator 130 and across the secondary winding 119 of transformer 120 are added and fed into modulator 116. If the suspension channel shown here is assumed to act along an X axis perpendicular to the spin axis Z of the rotor, then an identical channel will control the forces along the Y axis perpendicular to both the X and Z axes, except that the output signal of the speed control oscillator in the Y channel will be in 90° phase relationship with the output signal of speed control oscillator 125 in the X channel. A third channel is necessary to balance the forces along the Z axis, but it can be without the speed control oscillator since it controls forces along the spin axis and is therefore incapable of producing rotational torques about the spin axis.

The description above has referred to the gimbaled mode of operation. In the strapped down mode, where the electrode structure is not servoed to maintain a constant relationship with the inertial member and the spin axis is not always aligned along the Z axis of the supporting electrode structure, a speed control oscillator would also be required in the Z channel, and means would have to be provided to control and properly relate the magnitude and phases of the output signals from the speed control oscillators in the respective channels.

The specific embodiment of the present invention has been shown here to provide a clear teaching of the present invention. Many variations and embodiments are possible in the spirit of this invention however, and it is understood that the specific embodiment of my invention shown here is for the purpose of illustration only. It is intended that my invention be limited only by the scope of the appended claims.

I claim as my invention:
1. In an inertial instrument:
a housing defining a hollow, substantially spherically shaped cavity;
three pairs of electrically isolated electrodes mounted on said housing and adjacent to said cavity, the two electrodes of each pair being positioned at diametrically opposite locations on said cavity and centered on one of three mutually perpendicular axes X, Y, and Z;
electric field establishing means connected to said electrodes;
an electrically conductive, substantially spherically shaped member positioned within said cavity and adapted for rotation about a spin axis at an angular rate $\omega$, said spin axis being substantially parallel to said Z axis;
a speed control oscillator means providing an output signal whose frequency corresponds to a preferred angular rate of said member and is substantially equal to $\omega$;
a 90° phase network means having an input and an output;
means connecting said oscillator to said two electrodes of said electrode pair along said X axis to apply said output signal of said oscillator between said two electrodes of said pair along said X axis;
means connecting said output of said signal generating means to said input of said 90° phase network means and,
means connecting said 90° phase network means to said electrodes of said electrode pair along said Y axis to apply between said two electrodes of said pair along said Y axis a signal equal to, but in 90° phase relation with, the signal between said electrodes along said X axis.

2. In an inertial instrument:
a housing defining a hollow, substantially spherically shaped cavity;
three pairs of electrically isolated electrodes mounted on said housing and adjacent to said cavity, the two electrodes of each pair being positioned at diametrically opposite locations in said cavity and centered on one of three mutually perpendicular axes X, Y, and Z;
electric field establishing means connected to said electrodes;
an electrically conductive, substantially spherically shaped member positioned within said cavity and adapted for rotation about a spin axis at an angular rate $\omega$, said spin axis being substantially parallel to said Z axis;
a signal generating means having a first and a second output, providing at said first output a first signal whose frequency is equal to the desired angular velocity of said inertial member and providing at said second output a second signal equal to said first signal but displaced by 90° in time with said first signal;
means connecting said first output of said signal generating means to said two electrodes of said electrode pair along said X axis to apply said first signal between said two electrodes of said pair along said X axis; and means connecting said second output of said signal generating means to said electrodes of said electrode pair along said Y axis to apply said second signal between said two electrodes of said pair along said Y axis.

3. In an inertial instrument:

a support;

an electrically conductive inertial member positioned on said support and adapted for rotation about a spin axis at an angular rate $\omega$;

a first and a second pair of electrodes mounted on said support and adjacent to said member, said electrodes being electrically isolated from each other and forming an enclosure about said member generally concentric with said spin axis, the two electrodes of each said pair being positioned at diametrically opposite locations of said enclosure and centered on an axis extending substantially through the geometric center of said inertial member, the two axes of said two pairs being substantially normal to each other and to said spin axis;

a signal generating means having a first and a second output, providing at said first output a first signal whose frequency is equal to the desired angular velocity of said inertial member and providing at said second output a second signal equal to said first signal but displaced by 90° in time with said first signal;

means connecting said first output of said signal generating means to said first electrode pair, to apply said first signal between said two electrodes of said first pair;

and means connecting said second output of said signal generating means to said second electrode pair, to apply said second signal between said two electrodes of said first electrode pair.

4. Apparatus comprising:

a support;

an electrically conductive inertial member positioned on said support and adapted for relative rotation with said support about a spin axis at an angular rate $\omega$;

a first and a second pair of electrodes mounted on said support and adjacent to said member, said electrodes being electrically isolated from each other and forming an enclosure about said member generally concentric with said spin axis, the two electrodes of each said pair being positioned at diametrically opposite locations of said enclosure and centered on an axis extending substantially through said spin axis of said member, the two axes of said two pairs being substantially normal to each other and to said spin axis;

a signal generating means having a first and a second output, providing at said first output a first signal whose frequency is equal to the desired angular velocity of said inertial member and providing at said second output a second signal equal to said first signal but displaced by 90° in time with said first signal;

means connecting said first output of said generating means to said first electrode pair, to apply said first signal between said two electrodes of said first pair; and means connecting said second output of said generating means to said second electrode pair, to apply said second signal between said two electrodes of said first electrode pair.

5. In an inertial instrument:

a support;

an electrically conductive inertial member positioned on said support and adapted for rotation about a spin axis at an angular rate $\omega$;

a first and a second pair of electrodes mounted on said support and adjacent to said member, said electrodes being electrically isolated from each other and forming an enclosure about said member generally concentric with said spin axis, the two electrodes of each said pair being positioned at diametrically opposite locations of said enclosure and centered on an axis extending substantially through the geometric center of said interial member, the two axes of said two pairs being substantially normal to each other and to said spin axis;

a signal generating means providing an output signal whose frequency is equal to the desired angular velocity of said inertial member and is substantially equal to $\omega$;

a 90° phase network means, having an input and an output;

means connecting said output of said signal generating means to said first electrode pair, to apply a signal between said two electrodes of said first pair;

means connecting said output of said signal generating means to said input of said 90° phase network means; and means connecting said output of said 90° phase network means to said second pair of said electrodes, to apply a signal between said two electrodes of said second pair.

6. Apparatus comprising:

a support;

an electrically conductive member positioned on said support and adapted for relative rotation with said support about a spin axis at an angular rate $\omega$;

a first and a second pair of electrodes mounted on said support and adjacent to said member, said electrodes being electrically isolated from each other and forming an enclosure about said member generally concentric with said spin axis, the two electrodes of each said pair being positioned at diametrically opposite locations of said enclosure and centered on an axis extending substantially through said spin axis of said member, the two axes of said two pairs being substantially normal to each other and to said spin axis;

a signal generating means providing an output signal whose frequency is equal to the desired angular velocity of said inertial member and is substantially equal to $\omega$;

a 90° phase network means, having an input and an output;

means connecting said output of said signal generating means to said first electrode pair, to apply a signal between said two electrodes of said first pair;

means connecting said output of said signal generating means to said input of said 90° phase network means; and a means connecting said output of said 90° phase network means to said second pair of said electrodes, to apply a signal between said two electrodes of said second pair.

7. In an inertial instrument:

a support;

an electrically conductive inertial member positioned on said support and adapted for rotation about a spin axis at an angular rate $\omega$;

a plurality of electrodes mounted on said support and adjacent to said member;

means connected to said electrodes for establishing time varying electric forces between said electrodes and said member for the purpose of producing rotational torques on said member and maintaining the rotational velocity of said member substantially equal to $\omega$.

8. Apparatus comprising:
a support;
an electrically conductive member positioned on said support and adapted for relative rotation with said support about a spin axis at an angular rate $\omega$;
a plurality of electrodes mounted on said support and adjacent to said member;
means connected to said electrodes for establishing time varying electric forces between said electrodes and said member for the purpose of producing rotational torques on said member and maintaining the rotational velocity of said member substantially equal to $\omega$.

References Cited

UNITED STATES PATENTS

| 2,667,615 | 1/1954 | Brown | 310—5 |
| 2,756,352 | 7/1956 | Felici et al. | 310—5 X |
| 2,991,659 | 7/1961 | Bowden | 74—5.6 |
| 3,003,356 | 10/1961 | Nordsieck | 74—5 |
| 3,044,309 | 7/1962 | Buchhold | 74—5 |
| 3,098,679 | 7/1963 | De Boice | 308—8 |

FOREIGN PATENTS 1,062,965   8/1959   Germany.

C. J. HUSAR, *Primary Examiner.*